United States Patent [19]

Anderson et al.

[11] Patent Number: 4,535,374
[45] Date of Patent: Aug. 13, 1985

[54] WHITNEY-TYPE HEAD LOADING/UNLOADING APPARATUS

[75] Inventors: Kurt M. Anderson, Louisville; James H. Morehouse, Jamestown, both of Colo.

[73] Assignee: Amcodyne Incorporated, Longmont, Colo.

[21] Appl. No.: 439,190

[22] Filed: Nov. 4, 1982

[51] Int. Cl.³ .......................... G11B 5/60; G11B 15/64; G11B 17/32
[52] U.S. Cl. ........................................ 360/103; 360/97; 360/104; 360/105; 360/86
[58] Field of Search ........................... 360/102–105, 360/109, 97–98, 75, 86

[56] References Cited

U.S. PATENT DOCUMENTS

| | | | |
|---|---|---|---|
| 3,713,121 | 1/1973 | Fasano et al. | 360/103 |
| 3,786,457 | 1/1974 | Kahn | 360/103 X |
| 3,914,791 | 10/1975 | Stebe | 360/103 |
| 4,017,898 | 4/1977 | Toombs | 360/105 |
| 4,204,235 | 5/1980 | Stollorz | 360/105 X |
| 4,206,489 | 6/1980 | Manzke et al. | 360/105 |

Primary Examiner—John H. Wolff
Attorney, Agent, or Firm—Sheridan, Ross & McIntosh

[57] ABSTRACT

An apparatus is provided for loading a head onto a spinning disk and unloading the head from the spinning disk so that contact between the head and the disk is essentially prevented. The apparatus includes a Whitney-size head joined to the flexure of a Whitney-type suspension arm. A triangular-shaped ramp is fixed to a face of the suspension arm for engagement with a stationary cam. The stationary cam is located along the path of movement of the head, suspension arm and flexure. The contact between the cam and ramp causes movement of the head relative to the disk. In the case of loading the head, this movement results in a desired approach of the head towards the disk and enhances loading of the head onto the disk.

6 Claims, 8 Drawing Figures

WHITNEY-TYPE HEAD LOADING/UNLOADING APPARATUS

FIELD OF THE INVENTION

The present invention relates to an apparatus for dynamically loading a head onto a disk and, in particular, to an apparatus for ramp loading/unloading a head onto and off of a rigid magnetic disk.

BACKGROUND ART

The use of magnetic disks for data storage has become widespread in the computer industry. Data can be stored on both sides of a magnetic disk in concentric circular recording tracks. To translate data to and from a spinning disk during read/write operations, at least one magnetic transducer is situated within microinches of a surface of the disk. To accommodate such positioning, the transducer is affixed to a specially designed platform. The platform is aerodynamically designed to fly on a thin cushion of ambulant air adjacent to the recording surface that is created by the spinning disk. The air cushion serves to define the clearance between the communicating faces of the transducer/platform combination, hereinafter referred to as a head, and spinning disk. In general, as head size is decreased, greater head stability with respect to the topography of the spinning disk can be achieved. Increased head stability minimizes the likelihood of destructive contact between the head and disk, thereby allowing the head to fly closer to the disk surface. As head/disk clearance is decreased, the density of data stored on the disk can be increased. The smallest commercially available head is shown in U.S. Pat. No. 4,167,765. The head shown therein is known in the art as a Whitney head, and is currently employed in the IBM 3370 and 3380 disk drive systems.

Each head in a magnetic disk storage system is supportably connected to a flexure. The flexure allows the head to pitch and roll relative to the associated disk's spinning surface, so that a substantially parallel relationship between the communicating faces of the head and disk can be maintained during read/write operations. Such a parallel relationship contributes to the realization of accurate data translation. Examples of different types of flexures are described and illustrated in U.S. Pat. Nos. 3,896,495, 4,167,765, ad 4,302,789.

Typically, the flexure is supportably connected to the free end of a predominantly flat, cantilevered suspension arm which is attached to a movable carriage adjacent to the associated disk. To radially access the plurality of concentric recording tracks on a magnetic disk, the carriage is oriented so as to move along a horizontal axis that coincides with a radial line extending from the center of the associated disk. Since the position of the carriage relative to the disk is electrically controllable, the head, which is operatively associated with the carriage, can be radially positioned to read from and write onto each of the concentric recording tracks.

The suspension arm, or a component member thereof, is spring-loaded in a conventional manner to provide vertical loading force on the head so as to urge the head towards the associated disk, and counterbalance the air bearing force associated with the aforementioned cushion of ambulant air. In this manner, the desired head/disk clearance can be maintained during read/write operations as variations in the disk surface are encountered. Maintenance of a near constant head/disk clearance, and substantially parallel relationship between the head and disk as previously discussed, is necessary to insure accurate data translation and minimal head/disk destructive contact. It should be emphasized that the density of data stored on on a magnetic disk, and the signal-to-noise ratio established during data translation, can be increased as the head/disk clearance constant is decreased. Therefore, it is desirable to maintain as small a clearance constant as possible to maximize both the accuracy of data translation and the data storage capabilities of a computer system. The smallest head/disk clearance constant found in a commercially available disk drive system, is realized through the employment of a unique head/flexure/suspension arm combination, as illustrated and described in U.S. Pat. No. 4,167,765. That combination is known in the art as Whitney technology. The combination of a Whitney head, flexure and suspension arm is presently employed in the IBM 3370 and 3380 disk drive systems.

Two basic methods have been employed for loading a head onto an air cushion for read/write operations. In the first method, known as contact start/stop loading, the head is initially at rest directly on the face of a still magnetic disk. The face of the head that is adjacent to the disk surface is designed so that as the disk begins to spin, the head will be lifted off the disk surface by the ambulant air. When the disk reaches a predetermined speed, the desired disk/head clearance will be established for read/write operations.

There are three principal drawbacks to contact start/stop loading. First, when the disk begins to spin, the head must initially drag along the disk surface before it is lifted off. Such frictional contact tends to deteriorate the head and disk, and eventually necessitates replacement of both components and translation of the stored data onto another disk. These are costly consequences. The second drawback relates to the sticking of the head to the disk surface. This sticking may occur, for example, as a result of overlubrication of the disk or the presence of condensation between the communicating faces of the head and disk. In such situations, the head and disk do not readily separate when the disk begins to spin, and damage to the head/flexure combination may result. Third, storage disks are not readily interchangeable since both the head and suspension arm are typically in close spatial relation to the disk at all times. Replacement of a disk requires repositioning of the head and arm away from the disk. The addition of mechanisms to accomplish such repositioning tends to decrease the reliability of the system, and increase overall system costs. In light of increasing demands to increase data storage capabilities through the employment of removable magnetic disk cartridges, the third drawback to contact start/stop loading is becoming even more pronounced. It should be noted that the aforementioned IBM 3370 and 3380 disk drive systems employ contact start/stop loading.

The second method for loading a head onto an air cushion is known as dynamic loading. In this type of loading, the head, which is initially in a noncontact position relative to the disk surface, is loaded onto the air cushion while the disk is spinning. Perhaps the most common type of dynamic loading is realized through the employment of ramplike means. With this type of loading, known as ramp loading, the movable carriage is initially positioned so that the head is vertically and horizontally adjacent to the spinning disk. At least one stationary, independent member is positioned relative to the disk and suspension arm, so that as the carriage drives the arm towards the spinning disk a portion of the arm, or a component member thereof, will ride against the stationary member. The spring-loaded characteristic of the arm allows the arm to ride securely against the stationary member. Either the communicating face of the stationary member, or the riding portion of the arm, is at least partially designed with a ramp-like feature, so that as the head horizontally approaches the spinning disk it will experience vertical movement towards the air cushion. When the carriage approach is completed, the head will be properly positioned on a portion of the air cushion that is adjacent to the periphery of the disk surface. Specific techniques for ramp loading are further described and illustrated in U.S. Pat. Nos. 3,579,213, 4,280,156 and 4,302,789.

Dynamic loading is not subject to the second and third drawbacks described in connection with contact start/stop loading since the head is retracted from the disk during nonoperation of the system, and since replacement of a disk can be accomplished easily. There is, however, a potential problem with destructive disk/head contact when dynamic loading is employed. Such contact can occur during the loading of a head onto an air cushion, or upon unloading of the head from the cushion. Destructive contact during head loading usually occurs when vertical movement of a head towards an air cushion occurs to quickly, thereby allowing the kinetic energy of the head to drive the head through the air cushion and into the surface of the spinning disk. In addition, accelerated vertical head movement during loading operations can cause a head to flutter in pitch and roll and, since the flexure to which the head is connected is designed to permit such fluttering, a corner of the head may pierce the air cushion and collide with the disk surface. Such adverse head fluttering may also arise and lead to destructive contact when a head is vertically lifted from an air cushion too rapidly during unload operations. When ramp loading is employed, head fluttering may be initiated or compounded if the contact between the suspension arm and stationary member, during loading or unloading, is not centered about the gravitational center line for the head/flexure/suspension arm combination. This problem is discussed and dealt with in U.S. Pat. No. 4,302,789.

Although the prior art discloses variously configured head loading devices, there is no showing of the use of a combination, as described in the present invention, which employs Whitney technology and includes a Whitney-type suspension arm and flexure, and Whitney-size head to dynamically load a head onto a disk in a magnetic disk drive system.

DISCLOSURE OF THE INVENTION

The present invention is directed to a dynamic head loading apparatus which includes a carriage assembly for use in moving at least one combination of a Whitney-size head, Whitney-type flexure and Whitney-type suspension arm, relative to a disk. The head is connected to the tongue of the flexure, and the flexure is connected to the suspension arm. The head is used to read from and write onto a spinning disk. A ramp is joined to or formed into the suspension arm about its longitudinal axis. The ramp includes two sections which are formed relative to the suspension arm to provide a triangular-shaped ramp. A stationary cam is located along the path of the carriage assembly in order to engage the ramp.

In loading the head onto the disk, the first section of the ramp initially engages the cam as the head is moved towards the disk. This contact, in one embodiment, causes the suspension arm, flexure and head to be moved vertically relative to the plane of the disk. This movement continues until the second ramp section is engaged by the cam. At this time, the suspension arm, flexure and head move in a vertical direction towards the disk. After the second ramp section has passed by the cam, the head is in the loaded position parallel to the plane of the disk. The head can now be moved to a predetermined location relative to the spinning disk where the read or write operation is to occur.

In view of the foregoing, it is readily discerned that a versatile and easily controlled head loading apparatus is provided. This invention is particularly characterized by the use of a smaller head and suspension system and in which the head is dynamically loaded onto a spinning disk. The dynamic loading aspect of the present invention utilizes a unique ramp configuration for providing desired movement of the head relative to the disk during the loading/unloading of the head. Unlike contact start/stop loading of the head, the dynamic positioning disclosed in the present invention minimizes the possibility of damaging contact between the head and the disk. Moreover, dynamic loading permits the use of removable disks, which provide the capability of greater memory storage space.

Additional advantages of the present invention will become readily apparent from the following discussion, taken in conjunction with the accompanying drawings.

DETAILED DESCRIPTION OF THE PREFERRED EMBODIMENT

Figure 1:
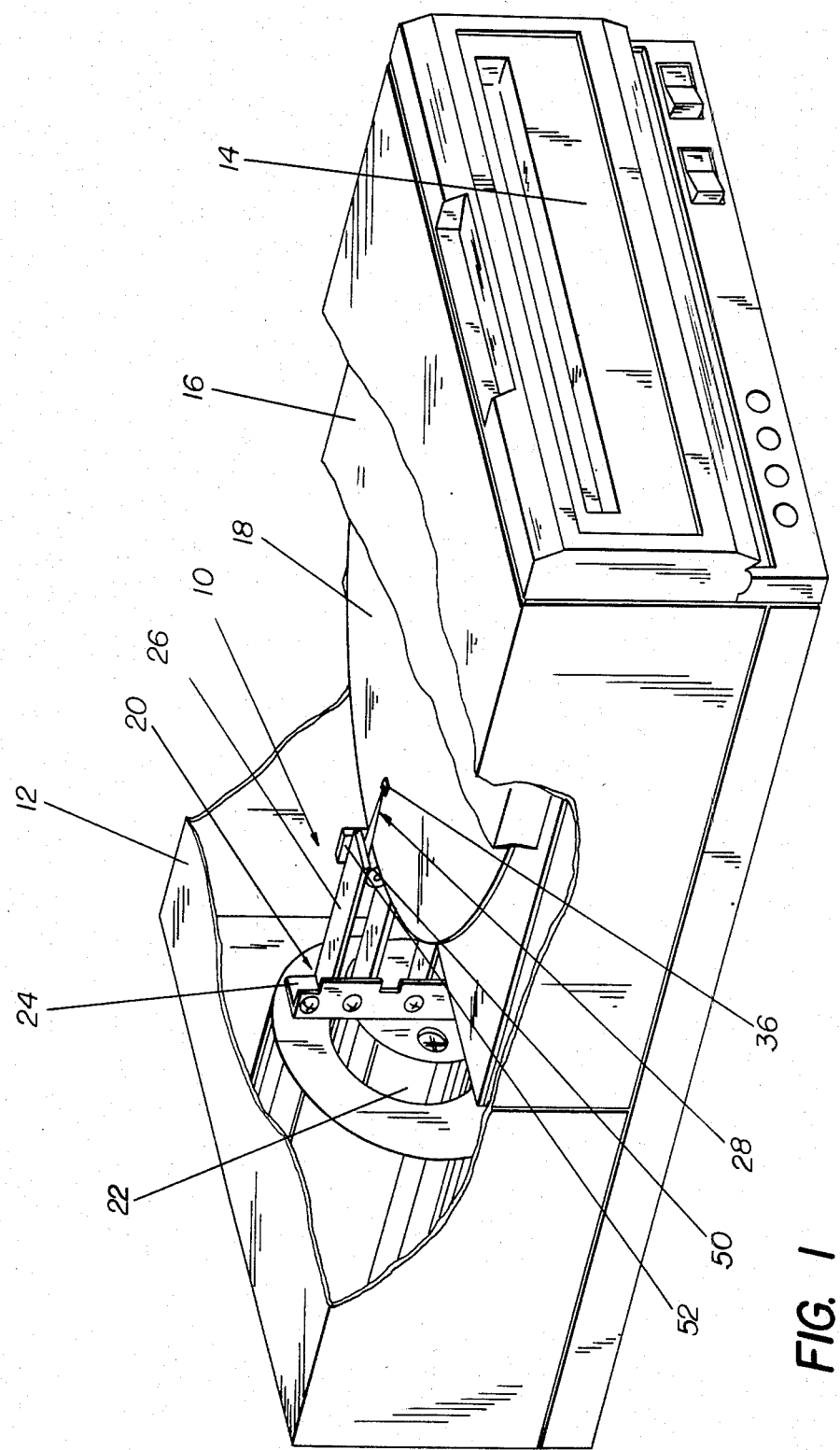
FIG. 1 is a perspective view, partially cutaway, showing the present invention utilized with a magnetic disk.

In accordance with this invention, FIG. 1 shows a head loading apparatus 10 arranged within a housing 12. A door 14, covering a horizontal, rectangular slot (not shown) on one side of the housing 12 is provided to receive a removable disk cartridge 16 that encases a magnetic data storage disk 18. It should be understood that the present invention can be arranged to provide an accessing means for both sides of removable or fixed disks that are positioned either horizontally or vertically, notwithstanding the description and drawings included herein.

The head loading apparatus 10 includes a carriage assembly 20 which is comprised of an electrically controllable linear positioner 22, a bracket member 24 affixed to the linear positioner 22, and at least one horizontal support arm 26 that is supportably connected to and extends perpendicularly from the bracket member 24. Portions of the linear positioner (not shown) and bracket member (not shown) are adapted to ride along at least one stationary, linear, horizontal guide rail (not shown) located within the housing 12. The guide rail is positioned so that its longitudinal axis lies in a vertical plane that bisects the magnetic disk 18.

Figure 2:
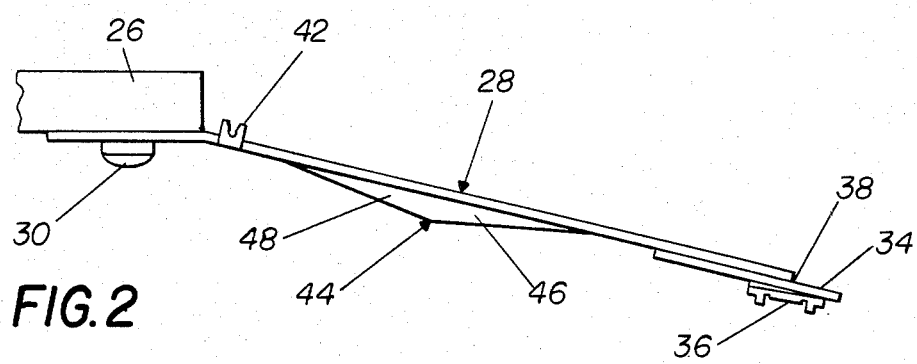
FIG. 2 is a side elevational view showing the Whitney-type suspension arm with the triangular shaped ramp, the Whitney-type flexure and the Whitney-size head.
Figure 3:
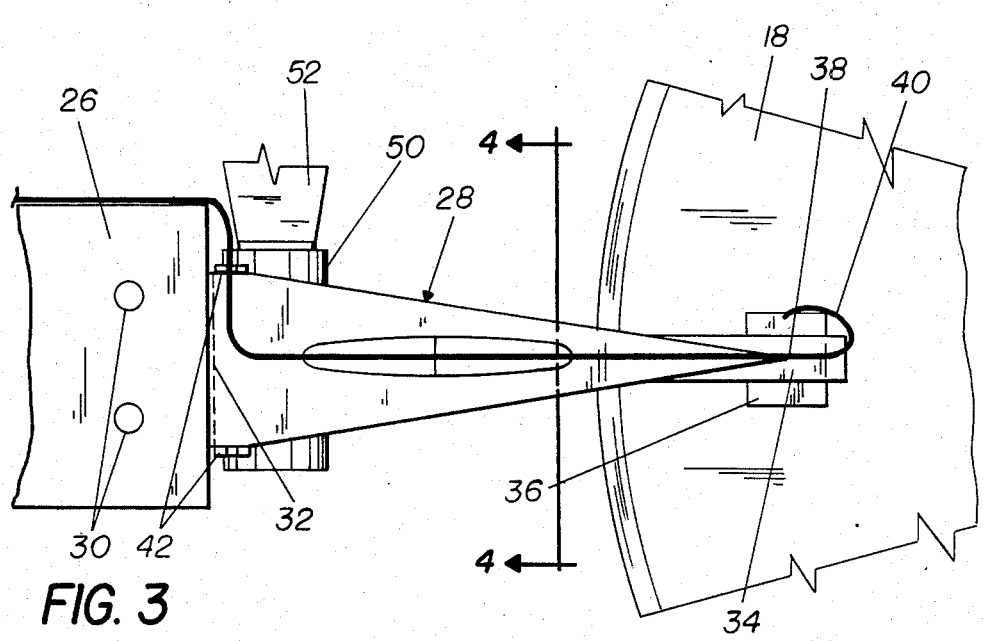
FIG. 3 is a top plan view of the Whitney-type suspension arm and flexure, and Whitney-size head.

As illustrated in FIGS. 2 and 3, a horizontally extending Whitney-type suspension arm 28 is supportably connected to said support arm 26 by screws 30, spot welds or other like means. The suspension arm 28 is bent slightly in a conventional manner about an axis 32 that perpendicularly intersects the longitudinal axis of the suspension arm 28 close to the connecting interface between the support arm 26 and suspension arm 28. Such bending creates a resilient, spring-like attribute in the suspension arm 28.

The free end of the suspension arm 28 supports a Whitney-type flexure 34 which is fastened thereto. A Whitney-size head 36 is supportably attached to the flexure 34. The suspension arm 28, flexure 34 and head 36, cooperate in such a manner that the apex 38 of the suspension arm 28 will apply a vertical spring loading force, created by the aforesaid bending, on the head 36 when it is positioned relative to the disk 18 for read/write operations.

As used herein, the term "Whitney-type suspension arm" is intended to denote a single-membered suspension arm of substantially the same triangular dimensions as the suspension arm employed in the IBM 3370 and 3380 magnetic disk drive systems. Similarly, the terms "Whitney-type flexure" and "Whitney-size head" are utilized herein to reference a flexure and head respectively, that are of substantially the same configurational design and dimensions as the flexure and head employed in the IBM 3370 and 3380 disk drive systems.

An electric wire 40, which carries electrical signals during read/write operations, is connected to the head 36 and extends up the suspension arm 28. At least one wire clip 42 is provided on the suspension arm 28 to keep the wire 40 in close association therewith.

Figure 4:
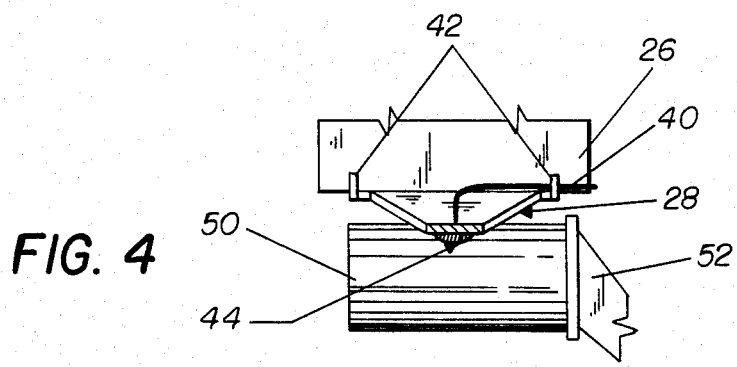
FIG. 4 is a lateral section, taken along line 4—4 of FIG. 3, showing further details of the ramp.

The suspension arm 28 employed in the present invention has a triangular, two-sided, longitudinal ramp portion 44 formed thereto that projects vertically from one face of the arm 28, see FIGS. 2 and 4. The ramp 44 is located substantially in the longitudinal mid-section of the arm 28 about the gravitational center line of the suspension arm 28, flexure 34 and head 36 combination. The ramp 44 is comprised of two contiguous ramp sections. The first ramp section 46, extends away from the free end of the suspension arm 28, and forms a gentle angle of inclination relative to the longitudinal axis of the arm 28. The second ramp section 48 extends away from the supported end of the suspension arm 28 at an angle of inclination, relative to the longitudinal axis of the suspension arm 28, that is substantially equal to the aforesaid angle created by the first ramp section 46.

It should be understood that a one-sided ramp, that extends away from the supporting end of the suspension arm 28, could be employed in the present invention. To realize the advantages discussed hereinafter that are achieved by virtue of the inclination of the second ramp section 48, however, the one-sided ramp would have to form a gentle angle of inclination, relative to the longitudinal axis of the suspension a 28, that is substantially similar to the angle of inclination created by ramp section 48.

One stationary, cylindrical cam 50, which is supportably connected to a stationary arm support 52, is positioned relative to the suspension arm 28, so that the center line of the ramp portion 44 of the suspension arm will ride against the cam when the head 36 is loaded onto the disk, see FIGS. 3, 4 and 5A-D.

Figure 5A:
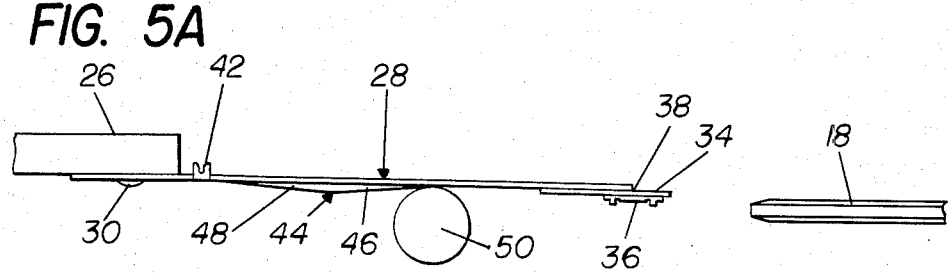
FIGS. 5A–5D are side elevational views showing the operation of the present invention in connection with the positioning of the head relative to the disk.
Figure 5B:
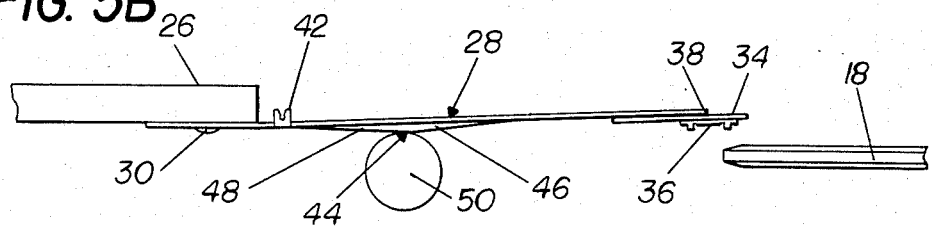

The operation of the present invention will now be described with particular reference to FIGS. 5A-D. FIG. 5A shows the relative positions of the disk 8, suspension arm 28, head 36 and cam 50 before head loading is commenced. As shown in FIG. 5A, the suspension arm 28, and flexure 34/head 36 combination supported thereby, are initially horizontally displaced form the spinning disk 18. In that position, the flexure 34/head 36 combination is vertically offset from the horizontal plane defined by the disk surface to be accessed. In addition, the cam 50 engages the suspension arm 28 at the juncture of the first ramp section 46 of the suspension arm 28, and the adjacent flat portion of the suspension arm 28. In that non-operational position, the aforementioned bend in the suspension arm 28 is maintained, thereby assuring the preservation of the springloaded attribute of the suspension arm 28 that is necessary for accurate data translation To position the head 36, the linear positioner 22 is electrically actuated so as to move the linear positioner 22 and bracket member 24 affixed thereto, along the aforesaid guide rails. Such movement drives the support arm 26, and suspension arm 28 supportably connected thereto, towards the spinning disk 18. As the suspension arm 28 approaches the disk 18, the first ramp section 46 of the ramp portion 44 of the arm 28 rides against the stationary cam 50, thereby permitting the flexure 34/head 36 combination, to clear the side of the disk 18, see FIG. 5B. When the second ramp section 48 passes over the cam 50, the head 36 is gradually positioned onto the ambulant air cushion 54 adjacent to the spinning disk surface, see Figure 5C. The head 36 is now properly loaded to read from or write onto the spinning disk 18. Due to the gentle angle of inclination of the second ramp section 48 of the suspension arm 44, the vertical movement of the head 36 towards the air cushion 54 during loading occurs slow enough to substantially prevent the kinetic energy of the head 36 from driving the head 36 through the air cushion 54 and into the surface of the spinning disk 18.

The spring loading force applied by the apex 38 of the suspension arm 28 to the head 36, allows the head 36 to ride on the air cushion 54 at a near constant head/disk clearance distance. The flexure 34 to which the head 36 is fastened, is designed to permit the head 36 to pitch and roll relative to the disk surface, so that a parallel relationship between the communicating faces of the head 36 and disk 18 can be maintained. A near constant head/disk clearance distance and head/disk parallel relationship, are necessary for accurate data translation and head/disk reliability.

Figure 5C:
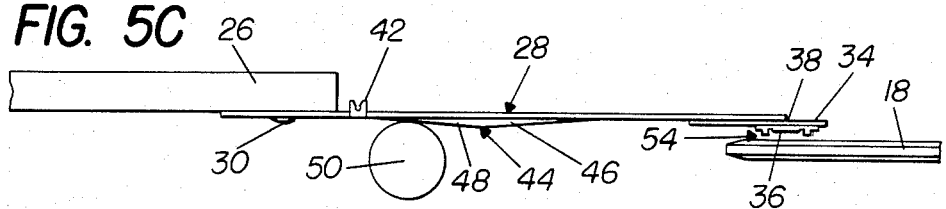
Figure 5D:
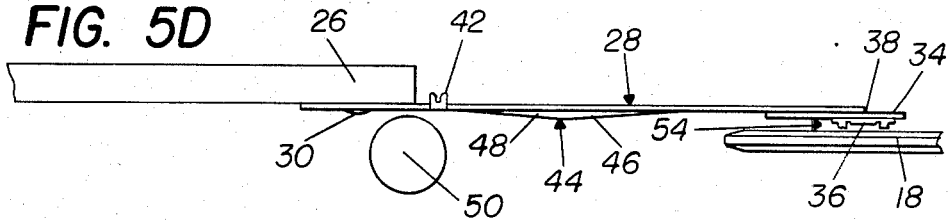

Once the head 36 is loaded for read/write operations, as shown in FIG. 5C, specific recording tracks on the disk 18 can be accessed by actuating the linear positioner 22 so as to drive the head 36 radially inward towards the center of the disk 18 to the desired recording track, see FIG. 5D. To unload the head 36 from the air cushion 54 after data translation is completed, the linear positioner 22 is actuated so as to move away from the spinning disk 18. As this occurs, the head 36 will be vertically and horizontally retracted from the disk surface. Due to the gentle angle of inclination of the second ramp section 48 of the suspension arm 44, the vertical movement of the head 36 away from the air cushion 54 during unloading, occurs slow enough to prevent head fluttering, thereby minimizing the possibility of destructive head/disk contact that could result from such fluttering. Finally, it should be noted that when an electrical power outage occurs during data translation operations, the linear positioner 22 is actuated to move radially away from the disk 18, thereby unloading the head 36 relative to the disk surface. When this happens, the retractive movement of the linear positioner 22 may be quite rapid and substantially unrestrained. As a result, the linear positioner 22 may collide with a stationary, resilient member (not shown) within the housing 12, and rebound back towards the disk 18. The movement of the linear positioner 22 may result in damage to the head 36, flexure 34, suspension arm 28, and or disk 18. The inclusion and configuration of the first ramp section 46 of the suspension arm 28 tends to minimize the possibility of such damage. The relatively small mass of the head 36 tends to prevent fluttering even in high speed retract conditions. That is, in the present invention, due to the small mass of the head 36 relative to the stiffness of the flexure 34 and suspension arm 28, the head 36 can be initially adjusted so that it will substantially maintain its preset position during operation of the disk drive system. In addition to minimizing head fluttering, the present invention also minimizes the need for close attitude tolerances. Attitude is the relative position of the head to the disk in pitch and roll when the head reaches the air cushion above the disk. Experience and testing have shown that a wide tolerance of head pitch and roll attitude, relative to the disk, is acceptable for reliable system operations. Tolerances on the order of +0.25° to +3.0° pitch, and ±1.0° roll are acceptable.

Based on the above detailed description, salient features of the present invention are easily recognized. The disclosed head loading/unloading apparatus employs the novel combination in a disk drive system of dynamic ramp loading/unloading and Whitney technology without sacrificing the benefits inherent in Whitney technology. Specifically, a Whitney-size head, and Whitney-type suspension arm and flexure are dynamically loaded onto a spinning disk so that virtually no contact occurs between the head and the disk. In this regard, the invention includes a novel ramp configuration formed on the suspension arm. This ramp design permits a desired, gradual path of approach to the disk in order to minimize damaging contact between the disk and the head. In addition, the use by the present invention of Whitney technology in a dynamic loading/unloading apparatus allows for increased storage on the disk since the head is able to be located relatively close to the disk surface for reading and writing operations.

Although the present invention has been described with reference to a particular embodiment, it is readily understood that variations and modifications can be effected within the spirit and scope of this invention.

What is claimed is:

1. In an apparatus for positioning a head relative to a magnetic disk for translating data during read/write operations, an assembly comprising:
   a Whitney-size head, said Whitney-size head being spaced from the disk during the positioning of said Whitney-size head for read/write operations;
   a Whitney-type flexure to which said Whitney-size head is supportably connected;
   a substantially triangular-shaped Whitney-type suspension arm having a longitudinal axis, said Whitney-type suspension arm being sent about an axis that perpendicularly intersects said longitudinal axis of said Whitney-type suspension arm; and
   dynamic loading means, operatively associated with said Whitney-type suspension arm, said dynamic loading means including a cooperating portion and a ramp-like member for use in positioning said Whitney-size head relative to the magnetic disk for data translation therewith, wherein said cooperating portion and said ramp-like member provide for simultaneous horizontal and vertical movement of said Whitney-size head relative to the disk as said cooperating portion and said ramp-like member movingly engage each other, said moving engagement between said cooperating portion and said ramp-like member being along the gravitational center line of the combination of said Whitney-type suspension arm, said Whitney-type flexure, and said Whitney-size head to minimize unwanted movement of the Whitney-size head during positioning thereof relative to the magnetic disk.

2. An apparatus, as set forth in claim 1, wherein said ramp-like member is integrally formed with said Whitney-type suspension arm.

3. An apparatus, as set forth in claim 2, wherein said ramp-like member is longitudinally centered about the gravitational center line of said Whitney-type suspension arm.

4. An apparatus, as set forth in claim 3, wherein said ramp-like member comprises a first ramp section and second ramp section that are contiguously adjacent.

5. An apparatus, as set forth in claim 1, wherein said longitudinal axis of said Whitney-type suspension arm substantially corresponds with said gravitational center line of the combination of the Whitney-type suspension arm, said Whitney-type flexure, and said Whitney-size head to minimize unwanted movement of the Whitney-size head during positioning thereof relative to the magnetic disk.

6. In an apparatus for positioning a head relative to a spinning magnetic disk for translating data during read/write operations, ramp loading means comprising:
   a movable suspension arm adapted to be operatively associated with the head;
   a cooperating member; and
   ramp-like means, fixedly held to said suspension arm, that comprises a substantially linear first ramp section having a length that is non-parallel to said suspension arm, a substantially linear second ramp section having a length that is non-parallel to said suspension arm, and a portion between said first ramp section and said second ramp section having a length and joining said first ramp section and said second ramp section together, each of said lengths of said first and second ramp sections being greater than said length of said joining portion, and, before translating data during read/write operations, said first ramp section causing the head to move in a first direction during moving engagement between said first ramp section and said cooperating member and said second ramp section causing the head to move in a second direction during moving engagement between said second ramp section and said cooperating member, both said first direction and said second direction being comprised of a horizontal component of movement and a vertical component of movement.

* * * * *

UNITED STATES PATENT AND TRADEMARK OFFICE
CERTIFICATE OF CORRECTION

PATENT NO. : 4,535,374
DATED : August 13, 1985
INVENTOR(S) : KURT M. ANDERSON ET AL.

It is certified that error appears in the above—identified patent and that said Letters Patent is hereby corrected as shown below:

Column 3, line 48, delete "discloses" and substitute therefor --discloses--.

Column 6, line 9, delete "8" and substitute therefor --18--.

Column 8, line 1, delete "sent" and substitute therefor --bent--.

Column 6, line 14, delete "form" and substitute therefor --from--.

Column 6, line 41, delete "44" and substitute therefor --28--.

Column 7, line 1, delete "44" and substitute therefor --28--.

Column 7, line 17, delete "and or" and substitute therefor --and/or--.

Signed and Sealed this

Seventh Day of January 1986

[SEAL]

Attest:

DONALD J. QUIGG

Attesting Officer

Commissioner of Patents and Trademarks